J. E. BELL.
WASTE HEAT BOILER CLEANING SYSTEM.
APPLICATION FILED OCT. 19, 1920.
1,408,973.
Patented Mar. 7, 1922.
2 SHEETS—SHEET 1.
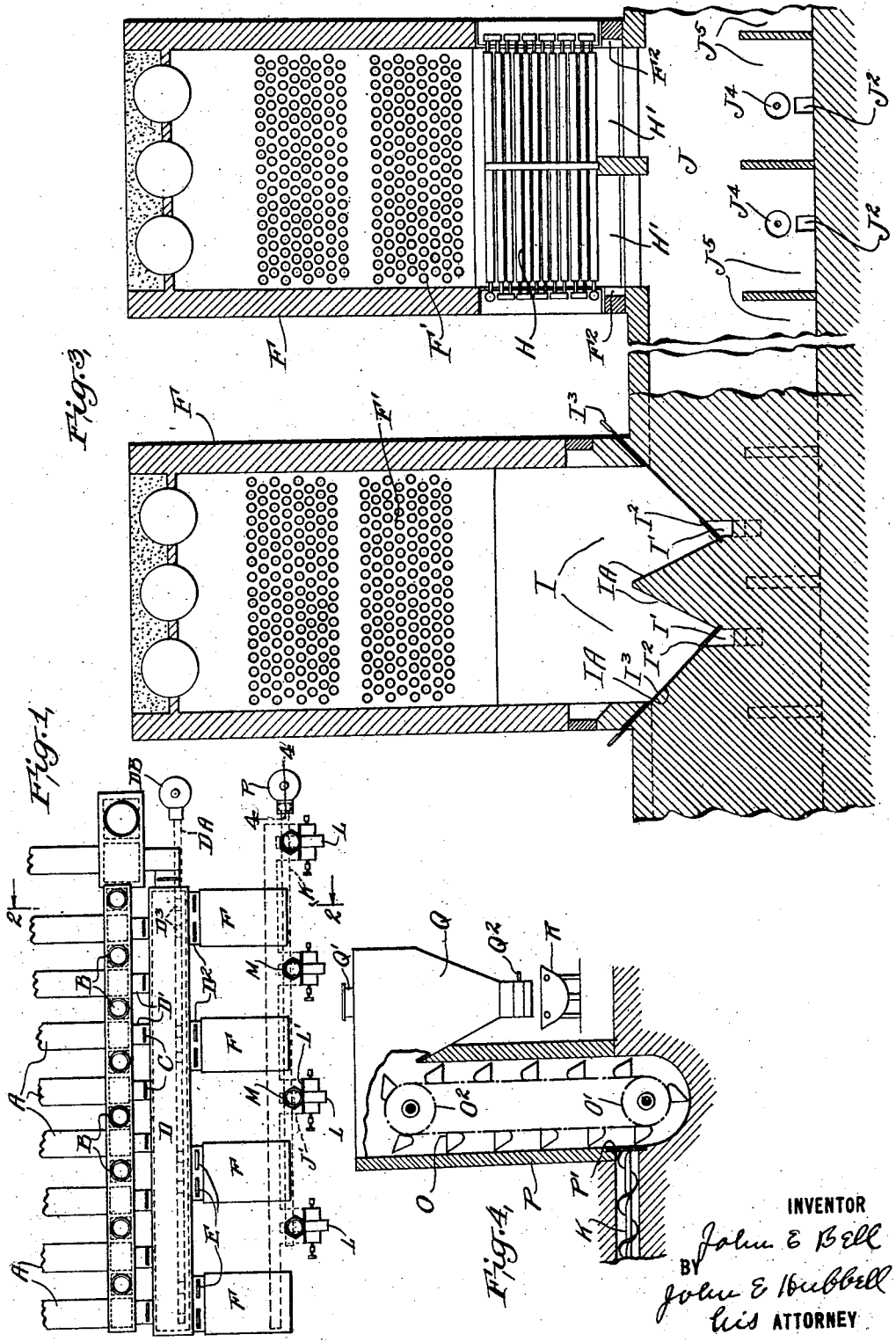

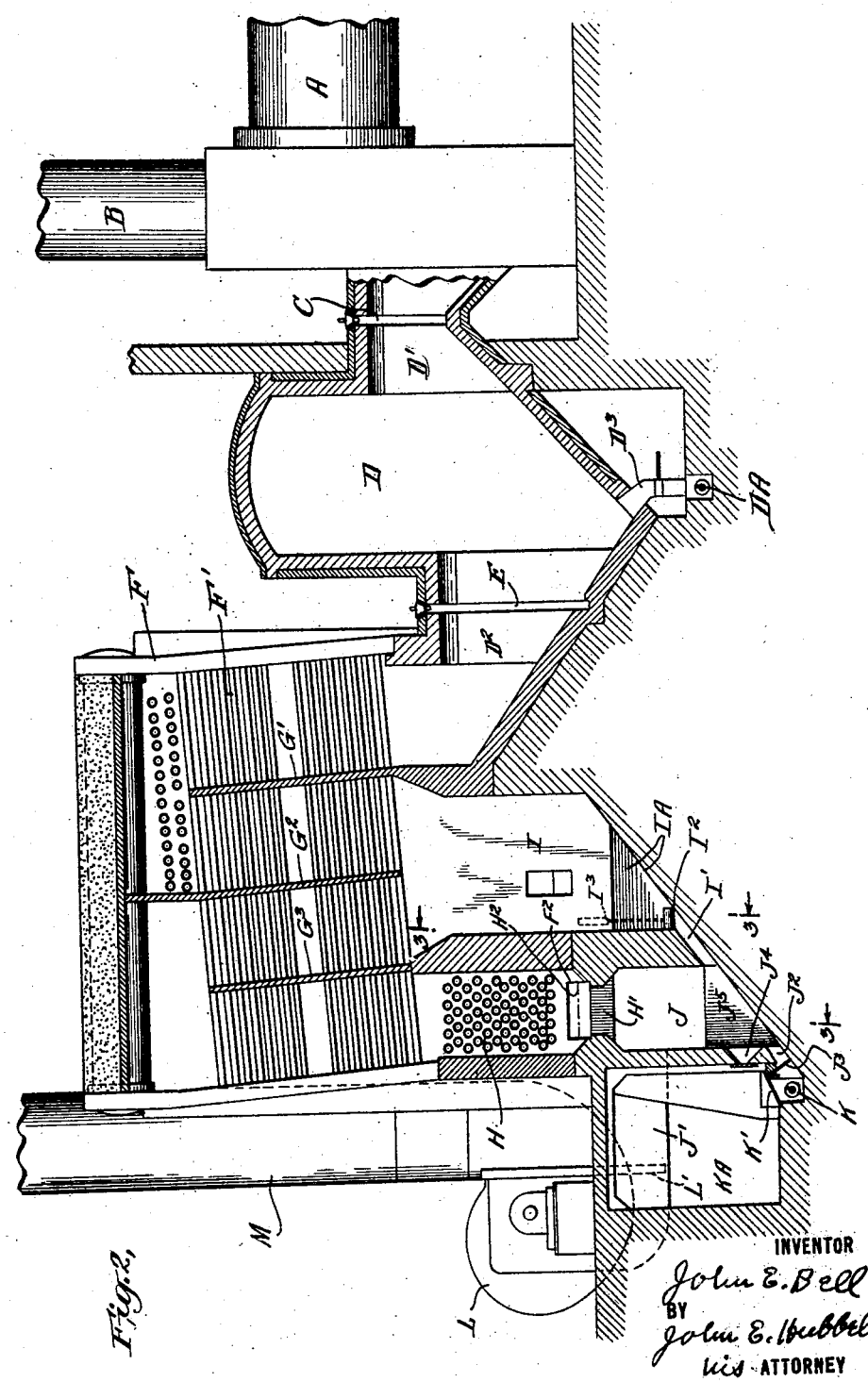

UNITED STATES PATENT OFFICE.

JOHN E. BELL, OF NEW YORK, N. Y.

WASTE-HEAT BOILER-CLEANING SYSTEM.

1,408,973.  Specification of Letters Patent.  Patented Mar. 7, 1922.

Application filed October 19, 1920. Serial No. 417,900.

*To all whom it may concern:*

Be it known that I, JOHN E. BELL, citizen of the United States, and resident of the city of New York, in the county of Kings and State of New York, have invented certain new and useful Improvements in Waste-Heat Boiler-Cleaning Systems, of which the following is a specification.

The general object of the present invention is to provide improved means for disposing of the flue dust settling out of the heating gases in a waste heat boiler system employed to recover the available heat in the gases from cement kilns or other furnace gases carrying relatively large amounts of dust out of the furnaces from which they come.

My invention is especially adapted to use where, as in the waste heat boiler system of a cement plant practical considerations require the maintenance of strong draft suction at the heating gas outlets of the waste heat boilers. Under such conditions much trouble has heretofore been experienced in the removal of the flue dust accumulating in the portions of the waste heat boiler system in which a strong draft suction is maintained, since the opening of the boiler system to the atmosphere to permit the removal of dust deposits from time to time, permits an influx of atmospheric air which not only interferes with the maintenance of the proper draft conditions in, and hence materially disturbs the operation of the waste heat boiler system as a whole, but also tends to blow the deposits of flue dust back into inaccessible portions of the waste heat boiler system. I avoid these difficulties, in accordance with the present invention, by employing a conveyor to receive the dust settling out of the heating gases in the high vacuum portions of the waste heat boiler system and to pass this dust into a dust receiver in which as in the conveyor itself a vacuum, or minus pressure, corresponding to that in the portions of the waste heat boiler system from which the dust comes is normally maintained, and by making provisions for closing communications between the dust receiver and the waste heat boiler flue system from time to time, so that the dust receiver may then be opened to the atmosphere and the accumulated flue dust therein removed without interfering with the draft conditions in the waste heat boiler system.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred form of my invention.

Of the drawings;

Fig. 1 is a diagrammatic plan view of a waste heat plant;

Fig. 2 is a sectional elevation taken on the line 2—2 of Fig. 1;

Fig. 3 is a section on a broken line 3—3 of Fig. 2; and

Fig. 4 is a section on a line 4—4 of Fig. 1.

In the drawings I have illustrated the use of my invention in a waste heat boiler system for handling the hot gases from a battery of rotary cement kilns A. In the particular plant shown, each of the kilns A, normally discharges its hot gases into a common flue D, having an inlet connection D' from each of the kilns. C is the seat or guideway of a damper or valve arrangement of known form for closing off each connection D' when necessary. Each kiln A is provided with a corresponding stack B which is normally disconnected from the kiln but adapted to be connected thereto when the corresponding flue connection D' is closed to permit the operation of the kiln at that time without waste heat recovery. Associated with the flue D is a battery of waste heat boilers F, the housing of each boiler being connected to the flue D by an individual connection $D^2$ which may be closed when necessary by a damper inserted in the guideway or valve seat E. The bottom walls of the passages D' and $D^2$ and of the flue D are sloped as shown in Fig. 2 so that deposited dust tends to pass through the outlets $D^3$ into the screw conveyor DA located beneath and parallel to flue D, and discharging as shown into a dust receiver DB.

As shown the boilers F are water tube boilers and each is provided with baffles G', $G^2$ and $G^3$ transverse to the water tubes for causing the gases to traverse the intertube space four times from the inlet $D^2$ to the outlet of the boiler housing before entering the economizer H which is located beneath the water tubes at the front end of the boiler. Each economizer is normally connected at its bottom through a port H' to a flue J running parallel to the flue D. A damper or valve $H^2$ is provided for closing each port H' when necessary. Each damper $H^2$ may be put into and out of place through an opening $F^2$ provided for the purpose in the side of the boiler housing. Associated with the flue J are a plurality of motor driven exhaust fans L which discharge each into a corresponding stack M as shown and are connected to the flue J by corresponding inlet passages J' which are normally open but may be closed when necessary or desirable by dampers or valves L'.

Dust dropping out of the flue gases in the passes of the boiler between the baffle walls G' and $G^2$ and $G^2$ and $G^3$ collects in pockets I having sloping bottom walls which converge to downwardly sloping outlets I' normally closed, each by a damper or valve $I^2$ which may be opened from time to time by the manipulation of an operating extension $I^3$ extending to the exterior of the boiler housing. As shown there are two pockets I for each boiler, each provided with its outlet I'. The flue J is provided at its bottom with dust receiving pockets $J^5$ open at their tops to the flue J and into which the various outlets I' from the pockets I open as shown in Figs. 2 and 3. The bottom wall of the pockets $J^5$ and of the passages I' are similarly sloped so that dust passing into the pockets J' either directly from the flue J, or through the passages I', tends to pass out of the pockets J' through the normally open outlets $J^2$ into the casing of the screw conveyor K which extends parallel to the flue J and is connected at its discharge end to a dust receiver P. In the preferred construction shown the dust receiver P comprises a vertical elevator shaft in which is mounted a bucket conveyor O running over conveyor pulleys O' and $O^2$. The conveyor O discharges into a hopper Q having a normally closed air inlet Q' and a normally closed dust outlet $Q^2$. P' represents a valve or damper by which communication between the housing of the conveyor K and the interior of the dust receiver P may be closed when this is desirable.

In the normal intended operation of the apparatus illustrated, the hot gases from the kilns A are drawn out of the latter and thence through the passages D', flue D, passages $D^2$, the various boiler passes, economizers H, the flue J and passages J' by the draft created by the exhausters L which deliver the gases into the atmosphere through the stacks M. To get the high velocity of gas flow necessary for efficient heat absorption by the boilers and economizers, and to avoid objectionable deposits of dust on the heat absorbing surfaces of the boilers and economizers, a relatively strong draft suction must be maintained at the gas outlets from the boiler housings. For instance, in a plant of the character illustrated, the minus pressure normally maintained in the flue J will ordinarily be not less than five and may sometimes be as much as ten or twelve inches of water, although the minus pressure in the flue D will ordinarily not be more than an inch or two. The minus pressure in the dust pockets I will be somewhere near the mean of the minus pressures in the flues J and D.

Large quantities of cement dust are carried out of the kilns A by the gases leaving the latter, and this dust tends to settle out of the gases in the portion of the waste heat boiler system in which the gas flow velocity is relatively slow and in which the direction of gas flow is sharply altered. In the apparatus shown the greatest dust deposition occurs in the pockets I though substantial deposits also occur in the flues D and J. The flue dust tending to accumulate in the pockets J' either by deposition from the gas in the flue J or entering the pockets from the dust pockets I through the passages I', passes by gravity into the conveyor K since the same vacuum is normally maintained in the conveyor casing as in the flue J by reason of the numerous open passages $J^2$ connecting the conveyor casing to the flue J. The conveyor K moves this dust into the dust receiver P in which the same minus pressure is normally maintained as in the flue J by reason of the open communication between the flue J and the dust receiver P through the conveyor casing. In one mode of operation communication between the dust receiver and the conveyor K is cut off from time to time by closing the valve P', and the accumulation of dust in the hopper Q of the dust receiver may then be readily discharged by first opening the air inlet Q' in the top of the dust receiver to equalize the pressure in the latter with that of the atmosphere, and then opening the hopper outlet $Q^2$ whereupon the accumulated dust passes freely out of the hopper Q into a railroad car or other receptacle or conveyor located under the hopper. When the accumulated dust is removed from the hopper Q, the air inlet Q' and dust outlet $Q^2$ are closed and the valve P' is again opened. A vacuum is then quickly drawn in the dust receiver P corresponding to that in the flue J. The quantity of air drawn from the dust receiver into the flue J in drawing this vacuum is relatively small and the normal draft is not thereby disturbed except momentarily and in a relatively insignificant degree. When it is necessary to make repairs to the conveyor K, communication between the conveyor casing and the flue J is cut off, by closing the valve J³ in the passages J² before opening the conveyor casing. To facilitate such repairs the top of the conveyor casing may advantageously be made of readily removable metal plates K'. These are accessible through the tunnel KA. The operation of the conveyor K may be continuous except when the valve P' is closed from time to time to permit the removal of the dust accumulated in the hopper Q, or the conveyor K may be operated only at such intervals and for such periods as are necessary to dispose of the dust accumulated in the pockets J'. Normally closed openings J⁴ are provided for the insertion of a stick to clean out the passages I' if the latter become clogged. In an alternative mode of operation of which the apparatus disclosed is capable an accumulation of dust is normally maintained in the hopper Q sufficient to form a seal preventing the influx of air into the hopper when the damper Q² is opened. Under these conditions by suitable manipulation of the damper Q² dust may be discharged from the hopper Q either intermittently, or continuously at the rate at which it enters the hopper Q, without closing the valve P' or breaking the partial vacuum in the hopper Q or interrupting the operation of the conveyor K.

The dust conveyor DA and the receiver DB may be arranged and operated as are the dust conveyor K and receiver O if desired, though the relatively small differential normally maintained between the pressure of the atmosphere and the minus pressure in the flue D makes the disposal of the dust entering the conveyor DA a much less difficult and disturbing matter than the removal of the dust from the pockets J'.

The valves controlling the passages I' are normally closed to maintain the proper draft differential between the flue J and the passes of the boiler directly open to the dust pockets I. From time to time the valves I² are opened to permit the gravity flow of accumulated dust from the pockets I into the pockets J'. The action of gravity then tending to cause the dust to pass from the pockets I into the pockets J' is supplemented by the dust carrying effects of the streams of the furnace gases which then by-pass the third and fourth passes of the boilers through the channels I'. Novel features of the waste heat boiler system proper, disclosed but not claimed herein are claimed in my copending application, Serial No. 417,899 filed October 19, 1920.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims and that certain features of my invention may sometimes be used to advantage without the corresponding use of other features.

Having now described my invention, what I claim as new and desire to secure by Letters Patent, is:

1. In a waste heat boiler system a chamber in which a high draft suction is normally maintained, a second chamber in which a somewhat smaller draft suction is normally maintained, a passage through which flue dust accumulating in said second chamber may pass into the first mentioned chamber when said passage is open and means for opening and closing said passage.

2. In a waste heat boiler system comprising chambers in which flue dust tends to collect and in which different amounts of draft suction are normally maintained, the improvement which consists in a relative arrangement of said chambers and a passage connecting them so that when said passage is open, accumulated dust in the chamber in which the smaller draft suction is maintained tends to move by gravity through said passage into the other chamber, and provisions for opening and closing said passage.

3. In a waste heat boiler system comprising chambers in which flue dust tends to collect and in which a comparatively high draft suction is normally maintained, the improvement which consists in an elevated closed dust receiver provided with a bottom outlet for dust, a conveyor for removing dust from the chambers and elevating it into the upper portion of said receiver, and provisions for normally maintaining said conveyer and dust receiver in free communication with said chambers.

4. In a waste heat boiler system comprising chambers in which flue dust tends to collect and in which a draft suction is normally maintained, the improvement which consists in a closed dust receiver provided with a valved bottom outlet for dust, a conveyer for passing dust from the chambers into the upper portion of said receiver and provisions for normally maintaining the conveyor and dust receiver in free communication with said chambers and sealed from the atmosphere and for intermittently disconnecting the dust receiver from said chambers and opening its upper portion to the atmosphere.

5. In a waste heat boiler system comprising chambers in which flue dust tends to collect and in which a draft suction is normally maintained, the improvement which consists in a closed dust receiver provided with a valved bottom outlet for dust and a valved air inlet into the upper portion of said receiver, a conveyor for passing dust from the chambers into the upper portion of said receiver and provisions for normally maintaining the conveyor and dust receiver in free communication with said chambers and sealed from the atmosphere.

Signed at New York, in the county of New York and State of New York, this 16th day of October A. D. 1920.

JOHN E. BELL.